United States Patent
Newbold et al.

(10) Patent No.: US 12,498,299 B2
(45) Date of Patent: Dec. 16, 2025

(54) SAMPLING SYSTEM WITH A REPLACEABLE CASSETTE ASSEMBLY AND METHODS OF USING THE SAME

(71) Applicant: EMD Millipore Corporation, Burlington, MA (US)

(72) Inventors: David Dixon Newbold, Bend, OR (US); David Andrew Hansen, Bend, OR (US); Clinton Boyd Pepper, Bend, OR (US)

(73) Assignee: EMD Millipore Corporation, Burlington, MA (US)

( * ) Notice: Subject to any disclaimer, the term of this patent is extended or adjusted under 35 U.S.C. 154(b) by 942 days.

(21) Appl. No.: 17/609,144

(22) PCT Filed: Apr. 27, 2020

(86) PCT No.: PCT/IB2020/053956
§ 371 (c)(1),
(2) Date: Nov. 5, 2021

(87) PCT Pub. No.: WO2020/225645
PCT Pub. Date: Nov. 12, 2020

(65) Prior Publication Data
US 2022/0228954 A1   Jul. 21, 2022

Related U.S. Application Data

(60) Provisional application No. 62/844,688, filed on May 7, 2019.

(51) Int. Cl.
*G01N 1/10* (2006.01)
*B01L 3/00* (2006.01)

(52) U.S. Cl.
CPC .......... *G01N 1/10* (2013.01); *B01L 3/502715* (2013.01); *B01L 3/502738* (2013.01);
(Continued)

(58) Field of Classification Search
CPC ................ G01N 1/10; B01L 3/502715; B01L 3/502738; B01L 2200/141;
(Continued)

(56) References Cited

U.S. PATENT DOCUMENTS

| | | | |
|---|---|---|---|
| 2004/0144242 A1 | 7/2004 | Perut et al. | |
| 2007/0053796 A1* | 3/2007 | Gau | B01F 31/65 422/400 |

(Continued)

FOREIGN PATENT DOCUMENTS

| | | |
|---|---|---|
| ES | 2 158 808 A1 | 9/2001 |
| WO | 01/28682 A1 | 4/2001 |

(Continued)

OTHER PUBLICATIONS

Communication Pursuant to Article 94(3) EPC received for European Patent Application No. 20723548.2 mailing date Jul. 4, 2024, 5 Pages.

(Continued)

*Primary Examiner* — Jill A Warden
*Assistant Examiner* — Jacqueline Brazin
(74) *Attorney, Agent, or Firm* — EMD Millipore Corporation

(57) ABSTRACT

A sampling system can include a cassette assembly coupled to a station base that has a plurality of actuators. The cassette assembly can include a cassette base, a cassette top, and an elastomer membrane disposed between the cassette base and cassette top. The cassette base can include a sample inlet, a reservoir for receiving a sample from the sample inlet, a sample outlet, and a fluid flow path extending between the sample inlet, the reservoir, and the sample outlet.

8 Claims, 17 Drawing Sheets

(52) U.S. Cl.
CPC . *B01L 2200/141* (2013.01); *B01L 2300/0816* (2013.01); *B01L 2300/123* (2013.01); *B01L 2400/0487* (2013.01); *B01L 2400/0633* (2013.01); *B01L 2400/0638* (2013.01)

(58) Field of Classification Search
CPC ....... B01L 2300/0816; B01L 2300/123; B01L 2400/0487; B01L 2400/0633; B01L 2400/0638; B01L 2200/0684; B01L 2300/0848; B01L 2400/0478; B01L 2400/0481; B01L 2400/0655; C12M 33/00
USPC ........................................................ 422/503
See application file for complete search history.

(56) References Cited

U.S. PATENT DOCUMENTS

| | | |
|---|---|---|
| 2011/0319279 A1 | 12/2011 | Montagu et al. |
| 2013/0199646 A1 | 8/2013 | Brammer et al. |
| 2014/0123775 A1 | 5/2014 | Newbold et al. |
| 2014/0123777 A1* | 5/2014 | Newbold .............. C12M 37/00 73/864.63 |
| 2015/0151295 A1 | 6/2015 | Kimura et al. |
| 2015/0361387 A1 | 12/2015 | Kimura et al. |
| 2018/0280975 A1* | 10/2018 | Kilcoin ............. B01L 3/502738 |

FOREIGN PATENT DOCUMENTS

| | | |
|---|---|---|
| WO | 2012/103511 A2 | 8/2012 |
| WO | 2014/017219 A1 | 1/2014 |
| WO | 2015/073999 A1 | 5/2015 |
| WO | 2020/225645 A1 | 11/2020 |

OTHER PUBLICATIONS

Office Action received for Canadian Patent Application No. 3,138,722 mailing date Nov. 1, 2023, 4 Pages.

International Preliminary Report on Patentability received for PCT Application No. PCT/IB2020/053956, mailing date Nov. 18, 2021, 11 Pages.

International Search Report and Written Opinion, mailed Jun. 25, 2020, issued for International Patent Application No. PCT/IB2020/053956, 14 pages.

* cited by examiner

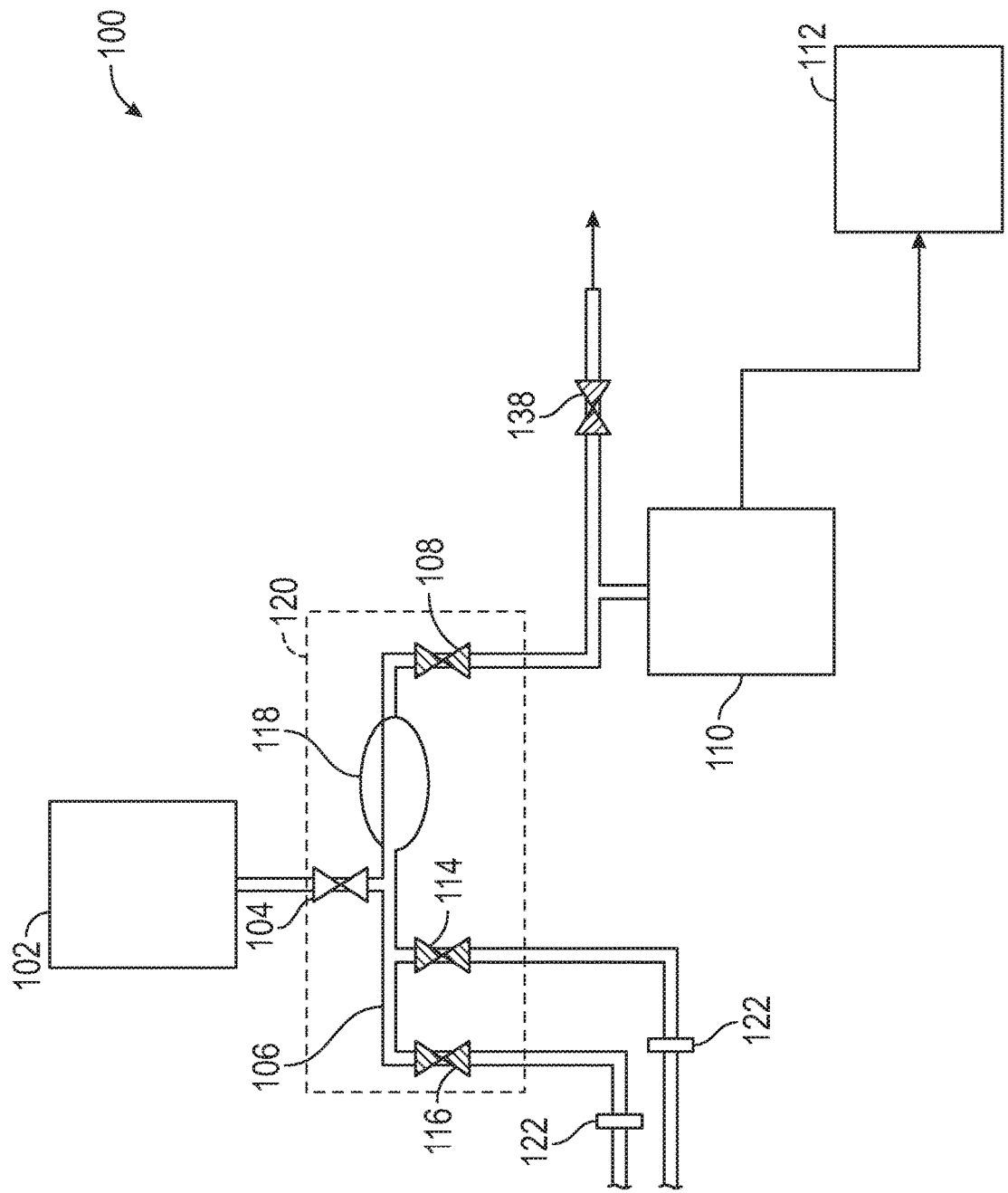

SAMPLING SYSTEM WITH A REPLACEABLE CASSETTE ASSEMBLY AND METHODS OF USING THE SAME

CROSS REFERENCE TO RELATED APPLICATIONS

This is the U.S. National Stage of International Application No. PCT/IB2020/053956, filed Apr. 27, 2020, which was published in English under PCT Article 21(2), which in turn claims the benefit of U.S. Provisional Application No. 62/844,688, filed May 7, 2019. The provisional application is incorporated herein in its entirety.

FIELD

The present disclosure is directed to a sampling system and methods of obtaining samples from containers, such as bioreactors.

BACKGROUND

Obtaining samples from containers or other systems that support biologically and/or chemically active environments can require complex and careful sampling procedures to avoid contamination of the containers or the environment itself, which can in some circumstances be a safety hazard. To reduce the risk of contamination within such systems, conventional sampling techniques generally require operators to perform multiple, labor-intensive steps. As such, improvements to such systems and methods are desirable.

SUMMARY

Various embodiments are disclosed herein of a sampling system, including a cassette assembly and a station base that can receive the cassette assembly, and methods of using the sampling system.

In some embodiments, sampling system includes a station base with a cassette-receiving surface and a plurality of actuators, and a cassette assembly received on the cassette-receiving surface. The cassette assembly can include a cassette base with a sample inlet, a reservoir for receiving a sample from the sample inlet, a sample outlet, and a fluid flow path extending between the sample inlet, the reservoir, and the sample outlet. The cassette assembly can also include a cassette top that has a plurality of movable members in engagement with respective ones of the plurality of actuators. The cassette assembly can also include an elastomer membrane disposed between the cassette base and the cassette top. One of the movable members can be in contact with the elastomer membrane to provide a sample inlet valve that can be opened and closed by a movement of one of the actuators, and the another one of the movable members can be in contact with the elastomer membrane to provide a sample outlet valve that can be opened and closed by a movement of another actuator.

In some embodiments, the elastomer membrane can extend over the reservoir and provides a pump membrane that is movable to vary a volume of the reservoir. The station base can include a pump member and the cassette top includes an air inlet disposed over a location of the reservoir that is in engagement with the pump member to vary a pressure at the pump membrane.

In some embodiments, the cassette base further comprises a sanitizing fluid inlet and a gas inlet and movable members that are in engagement with these inlets and additional actuators.

In some embodiment, the plurality of moveable members can comprise rocker valves that include a rocker arm in engagement with a respective one of the plurality of actuators and a ball that is in contact with the elastomer membrane. The rocker arms can be movable from a first position in which the respective valve is closed and a second position in which the respective valve is open, and each of the rocker arms can have a first end in engagement with a respective one of the plurality of actuators and a second end that is in contact with a spring member that biases the rocker arm to the first position.

In other embodiments, a cassette assembly is provided that includes a cassette base comprising a sample inlet, a reservoir for receiving a sample from the sample inlet, a sample outlet, and a fluid flow path extending between the sample inlet, the reservoir, and the sample outlet; a cassette top comprising a plurality of movable members including at least a first movable member and a second movable member; and an elastomer membrane disposed between the cassette base and the cassette top. The first movable member can be in contact with the elastomer membrane to provide a sample inlet valve that can be opened and closed by a movement of the first movable member, and the second movable member can be in contact with the elastomer membrane to provide a sample outlet valve that can be opened and closed by a movement of the second movable member. A plurality of openings in the cassette assembly can extend from respective ones of the plurality of movable members through the elastomer membrane and the cassette base to receive a plurality of actuators therethrough. In some embodiments, the elastomer membrane comprises silicone, EPDM, Viton, or CFLEX.

In another embodiment a method of collecting a fluid sample from an enclosed container is provided. The method can include securing a cassette assembly to a station base, positioning a plurality of actuators of the station base in engagement with respective ones of the plurality of movable members, actuating one of the plurality of actuators to engage with the third movable member to open the sample inlet valve and direct the fluid sample to the reservoir, applying a pressure to the elastomer membrane above the reservoir to cause the elastomer membrane to move into the reservoir and direct the fluid sample from the reservoir to the sample outlet, actuating another one of the plurality of actuators to engage with the fourth movable member to open the sample outlet valve and direct the fluid sample out of the sample outlet, removing the first cassette assembly from the station base, and securing another cassette assembly to the station base to replace the first one.

In some embodiments, the plurality of actuators comprise pneumatic air cylinders, and the pneumatic air cylinders are coupled to the station base, which is connected to a gas source and a sanitizing fluid source. Alternatively, the plurality of actuators can be electric actuators.

In other embodiments, the cassette assembly can contain all of the wetting components of the fluid sample collection and the station base is not directly exposed to the fluid sample. In other embodiments, portions of the station base can be exposed to the fluid sample, such as at a line out.

The foregoing and other objects, features, and advantages of the invention will become more apparent from the following detailed description, which proceeds with reference to the accompanying figures.

BRIEF DESCRIPTION OF THE DRAWINGS

FIG. 1 illustrates an exemplary sampling system for obtaining a sample from a bioreactor or other similar containers or systems that support biologically and/or chemically active environments.

DETAILED DESCRIPTION

Figure 2A:
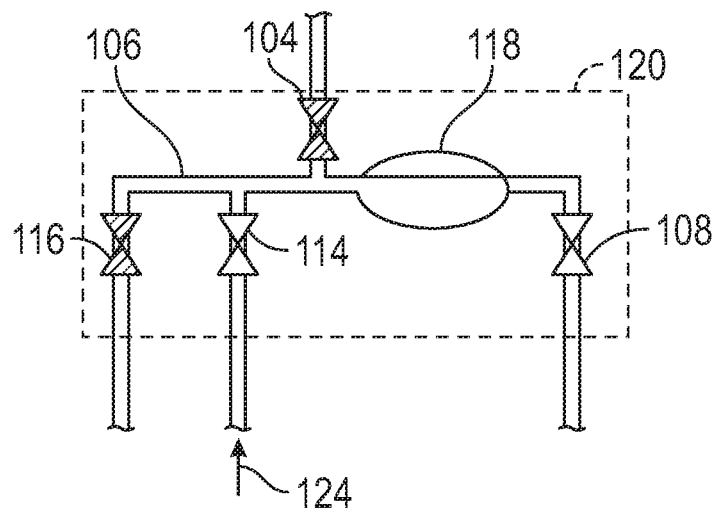
FIGS. 2A-2D are schematic representations of an exemplary operation of the sampling system of FIG. 1.

The systems and methods described herein, and individual components thereof, should not be construed as being limited to the particular uses or systems described herein in any way. Instead, this disclosure is directed toward all novel and non-obvious features and aspects of the various disclosed embodiments, alone and in various combinations and subcombinations with one another. For example, any features or aspects of the disclosed embodiments can be used in various combinations and subcombinations with one another, as will be recognized by an ordinarily skilled artisan in the relevant field(s) in view of the information disclosed herein. In addition, the disclosed systems, methods, and components thereof are not limited to any specific aspect or feature or combinations thereof, nor do the disclosed things and methods require that any one or more specific advantages be present or problems be solved.

As used in this application the singular forms "a," "an," and "the" include the plural forms unless the context clearly dictates otherwise. Additionally, the term "includes" means "comprises." Further, the term "coupled" or "secured" encompasses mechanical and chemical couplings, as well as other practical ways of coupling or linking items together, and does not exclude the presence of intermediate elements between the coupled items unless otherwise indicated, such as by referring to elements, or surfaces thereof, being "directly" coupled or secured. Furthermore, as used herein, the term "and/or" means any one item or combination of items in the phrase.

As used herein, the term "exemplary" means serving as a non-limiting example, instance, or illustration. As used herein, the terms "e.g.," and "for example," introduce a list of one or more non-limiting embodiments, examples, instances, and/or illustrations.

The terms "upstream" and "downstream" are not absolute terms; instead, those terms refer to the direction of flow of fluids within a channel or pathway. Thus, with regard to a structure through which a fluid flows, a first area is "upstream" of a second area if the fluid flows from the first area to the second area. Likewise, the second area can be considered "downstream" of the first area.

Unless otherwise indicated, all numbers expressing quantities of ingredients, properties such as molecular weight, percentages, measurements, distances, ratios, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "provide" and "produce" to describe the disclosed methods. These terms are high-level descriptions of the actual operations that are performed. The actual operations that correspond to these terms will vary depending on the particular implementation and are readily discernible by one of ordinary skill in the art having the benefit of this disclosure.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the detailed description, claims, abstract, and drawings.

FIG. 1 illustrates a sampling system 100 for obtaining a sample from a bioreactor 102 or other similar containers or systems that support biologically and/or chemically active environments. Sampling system 100 includes a sample collection valve 104 that can open to allow a sample to enter a fluid flow path 106. The sample can be delivered along the flow path 106 to an outlet valve 108. Outlet valve 108 can open or close to allow or restrict, respectively, the flow of samples through outlet valve 108. After the sample exits outlet valve 108, the sample can be directed into an isolated chamber or container 110 for analysis, processing, and/or delivery to another system for analysis and/or processing.

For example, the sample can be directed from chamber 110 to an automated analyzer 112, such as a bioprofile analyzer available from Nova Biomedical of Waltham, Mass.

The samples that are dispensed from outlet 108 for analysis or processing are desirably representative of the materials in bioreactor 102 at the time the sample was taken. To reduce the risk of contamination, dilution, or alteration of the composition of the samples taken from sample collection valve 104 and delivered through flow path 106, a sanitizing fluid can be delivered through a portion of flow path 106 that comes into contact with the samples.

To introduce the sanitizing fluid into flow path 106, a sanitizing fluid inlet valve, such as valve 114 or 116, is provided upstream of sample collection valve 104. The sanitizing fluid inlet valve 114, 116 is operable between a closed position that restricts fluid flow through sanitizing fluid inlet valve and an open position that allows fluid flow through sanitizing fluid inlet valve. In some embodiments, some or all of the valves can be biased closed.

As used here, a "sanitizing fluid" is any fluid that can sanitize, disinfect, or sterilize the valve. The sanitizing fluid can be a liquid, a gas, or a combination thereof. Sanitizing fluids include steam, ethylene oxide, glutaraldehyde, formaldehyde, formalin, chlorine gas, hypochlorite, bromine, hypobromite, iodine, hypoiodite, bromine chloride, chlorine dioxide, ozone, hydrogen peroxide, monochloramine, dichloramine, trichloramine, quatinary ammonium salts, ethanol, 70% ethanol/water, isopropanol, 70% isopropanol/water, peroxyacetic acid, and peracetic acid. In one embodiment, the sanitizing fluid is steam. In another embodiment, the sanitizing fluid is ethylene oxide. In another embodiment, the sanitizing fluid is glutaraldehyde.

A gas inlet valve, such as valve 114 or 116 (whichever is not used as the sanitizing fluid inlet valve) can also be provided upstream of sample collection valve 104 to deliver a gas through flow path 106. The gas can eliminate and/or reduce the amount of sanitizing fluid remaining within flow path 106 after flow path 106 is exposed to the sanitizing fluid. The sanitizing fluid can clean the path and/or remove any material from previous samples in the area contacted by the sanitizing fluid. The gas inlet valve is operable between a closed position that restricts the flow of gas through the gas inlet valve and an open position that allows the flow of gas through the gas inlet valve. In one embodiment, the gas comprises compressed air.

To draw a sample from bioreactor 102, a variable volume reservoir 118 can be provided downstream of sample collection valve 104. Variable volume reservoir 118 can be moveable between a first position and a second position to draw a sample through sample collection valve 104 and into flow path 106. The sample can be drawn into at least a portion of variable volume reservoir 118 along a first portion of flow path 106 and discharged from variable volume reservoir 118 along a second portion of flow path 106. Variable volume reservoir 118 can comprise a diaphragm pump as shown in FIG. 1, which can draw in a sample using a vacuum generated on the pump side.

As shown by dotted lines in FIG. 1, at least a portion of sampling system 100 can comprise a unitary structure 120. Thus, for example, unitary structure 120 can comprise sample collection valve 104, sanitizing fluid inlet valve and gas inlet valve 114, 116, outlet valve 108, and at least a portion of the fluid flow path. Preferably, the entire flow path between the sanitizing fluid inlet valve 114 and the outlet valve 108 is internal to the unitary structure 120.

If desired, one or more filters 122 (e.g., a sterile air filter) can be provided upstream of gas inlet valve, sanitizing fluid inlet valve 114, 116 to ensure that the gas or sanitizing fluid that enters flow path 106 is substantially free of impurities and/or contaminants.

FIGS. 2A-2D are schematic representations of the operation of sampling system 100. As described in more detail below, sampling system 100 can be coupled to bioreactor 102 and can operate to sanitize or sterilize a flow path from the sanitizing fluid inlet valve 114, 116 through through the closed pathway of flow path 106, including sample collection valve 104, reservoir 118 (e.g., a diaphragm pump), and outlet valve 108. By being able to sanitize or sterilize the flow path in this manner, the possibility of contaminating bioreactor 102 and/or the samples captured from bioreactor 102 is reduced.

FIG. 2A illustrates a sanitizing procedure in which a sanitizing fluid 124 (e.g., steam) is directed into flow path 106 through an open sanitizing fluid inlet valve 114 (in this embodiment). As shown in FIG. 2A, sanitizing fluid 124 is directed along flow path 106, including along the portions of flow path 106 that are in contact with a sample drawn from bioreactor 102 and dispensed along the flow path 106. For example, sanitizing fluid 124 is directed along flow path 106 past sample collection valve 104, through variable volume reservoir 118, and out outlet valve 108. As sanitizing fluid 124 comes into contact with the internal surfaces that define flow path 106, those surfaces are sanitized or sterilized.

Figure 2B:
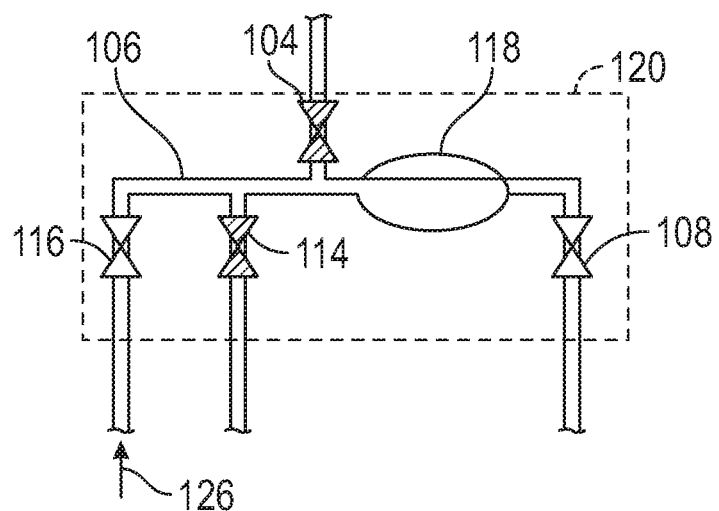

Referring now to FIG. 2B, sanitizing fluid inlet valve 114 (in this embodiment) is closed and gas inlet valve 116 (in this embodiment) is opened to allow a gas 126 (e.g., air) to enter flow path 106. As shown in FIG. 2B, gas 126 can also be directed along flow path 106, including along the portions of flow path 106 that sanitizing fluid 124 contacts. In this manner, any remaining sanitizing fluid 124 can be purged from flow path 106.

Figure 2C:
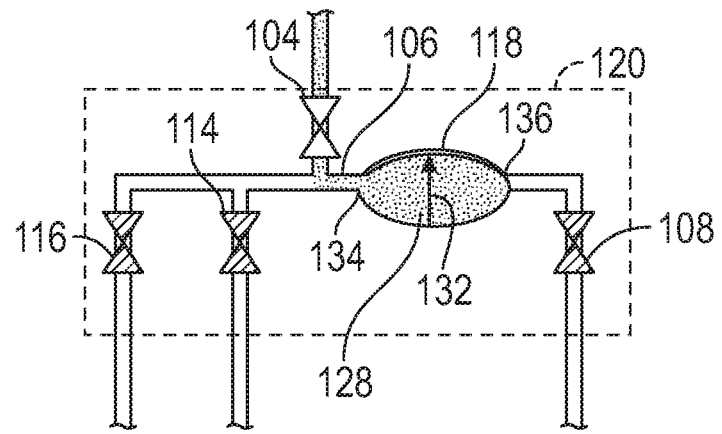

FIG. 2C illustrates the operation of variable volume reservoir 118 to draw a sample 128 from bioreactor 102 through open sample collection valve 104. As shown in FIG. 2C, variable volume reservoir 118 comprises a diaphragm pump that moves from a first volume to a second, larger volume as illustrated by arrow 132. The enlargement of the volume of variable volume reservoir 118 draws a sample through open sample collection valve 104 and into flow path 106. Variable volume reservoir 118 has an inlet 134 and an outlet 136. After sample 128 is drawn into variable volume reservoir 118, the diaphragm pump moves from the second, larger volume back to a smaller volume as illustrated by arrow 132 in FIG. 2D. The reduction of the volume of variable volume reservoir 118 discharges sample 128 through outlet 136 of variable volume reservoir 118. Sample 128 is then discharged through outlet valve 108 to be captured for analysis and/or further processing.

Referring again to FIG. 1, as sample 128 is discharged through outlet valve 108, it can be delivered to chamber 110. To facilitate delivery of sample 128 to chamber 110, a valve 138 can be provided downstream of outlet valve 108. Valve 138 can be closed to cause sample 128 to be directed into chamber 110. Valve 138 can be configured to open to allow the discharge of waste. The discharged waste can include, for example, sanitizing fluid and purging gas that has traveled along the flow path 106 to sanitize and purge excess sample materials from flow path 106.

The sampling systems described herein can include systems that have a reusable component that does not require sterilization between operations and a single-use component that is replaced between operations. The station base can contain all the required mechanical actuators (such as the pneumatic air cylinders or electric actuators, and variable volume pump components) and can be connected (e.g., plumbed) to the control system and purge air and sanitant sources.

Figure 3:
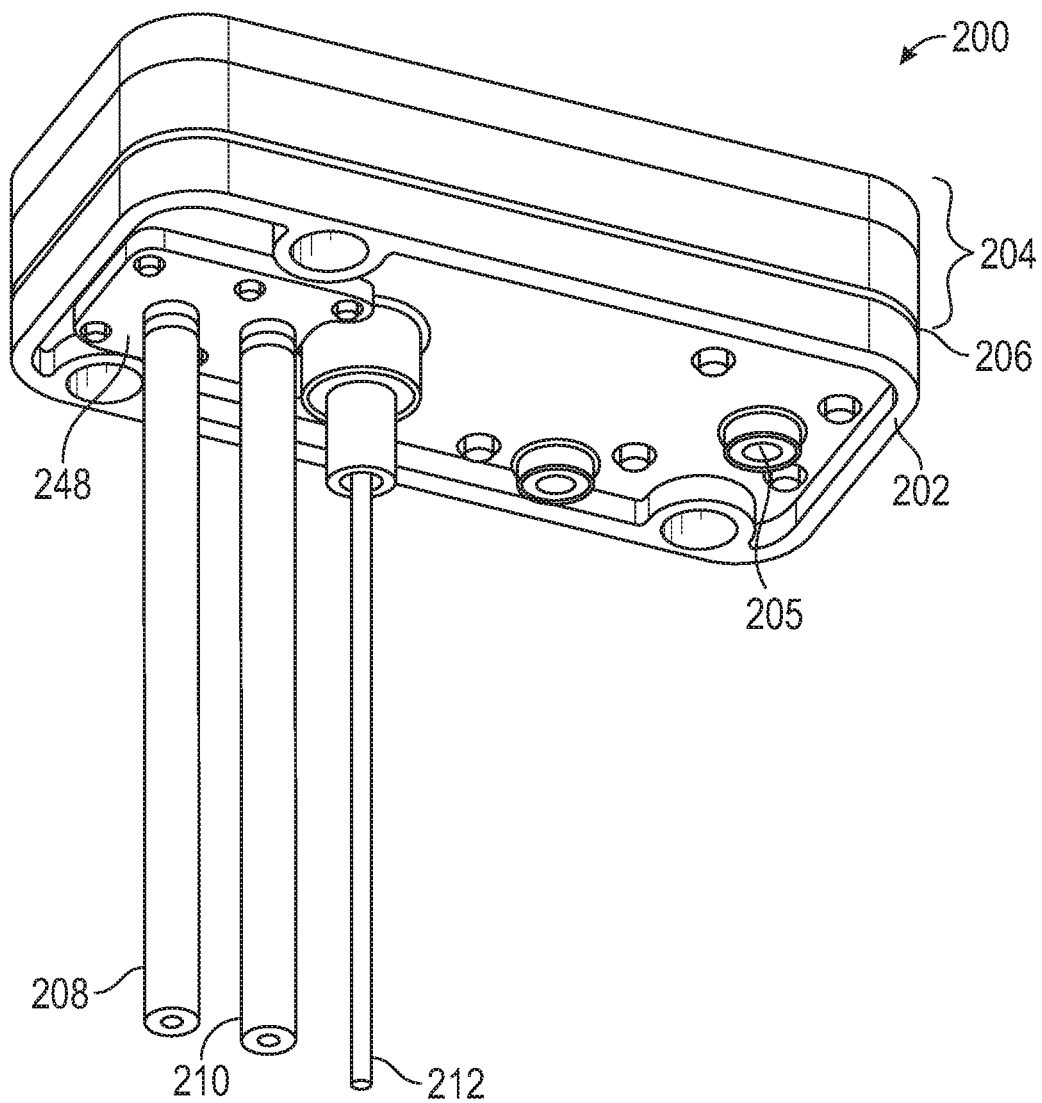
FIG. 3 illustrates an exemplary cassette assembly for a sampling system.

FIG. 3 illustrates the replaceable component (e.g., the unitary structure 120) of the sampling system as a cassette assembly. To provide reusability of the other components described herein (e.g., the station base with actuators), the cassette assembly can include all of the wetting components of the sampling system that come into direct contact with fluid. As used herein, the term "wetting component" as used herein means a component that comes in direct contact with a fluid (gas and/or liquid) and are typically include, for example, reservoirs, conduits, filters, and combinations thereof.

The term "cassette" as used herein means a cartridge or other structure capable of fitting and/or connecting to a sample inlet and one or more other fluid connections. The cassette can be a replaceable and/or disposable self-contained unit (e.g., a unitary structure) containing all wetting components of a sampling system of the type described herein. As used herein, the terms "disposable" refer to an element, component, and/or structure that may be disposed with and/or replaced after no more than 10 uses, preferably no more than 5 uses, preferably no more than 2 uses, most preferably no more than 1 use. As used herein, the term "single use" refers to a system that is used once. The term "uses or use," as used herein, means a sampling procedure that includes receiving a first type or kind of sample before changing to receive a different kind or type of sample.

An example of a single use of a cassette would be a situation where a bioreactor is set up, the cassette is connected and used through an entire bioreactor run, in the same manner as a single-use probe or single-use fitting the usage of which is well-known in the industry. After the bioreactor run is completed, the cassette can be removed and replaced.

In particular, FIG. 3 illustrates a cassette assembly 200 that includes a cassette base 202, a cassette top 204, and an elastomer membrane 206 disposed (e.g., fitted or assembles) between the cassette base 202 and cassette top 204. A plurality of valve ports are provided in the cassette base and each can be coupled to a tube or other conduit for coupling with other components of the sampling system. For example, FIG. 3 illustrates a first tube 208, which can be coupled to a gas source for delivering a gas to purge sanitizing fluid from the flow path 106, and a second tube 210, which can be coupled to a sanitizing fluid source to deliver sanitizing fluid to the flow path 106. A third tube 212 can be coupled to the bioreactor at sample outlet 205 to receive a sample. The elastomer membrane can be formed of any suitable elastomeric materials (such as, for example, silicone, ethylene propylene diene monomers (EPDM), Viton, and CFLEX) that can serve as a sealing surface for the plurality of valve ports and also as a pump membrane for the variable volume reservoir as described in detail below.

Figure 4:
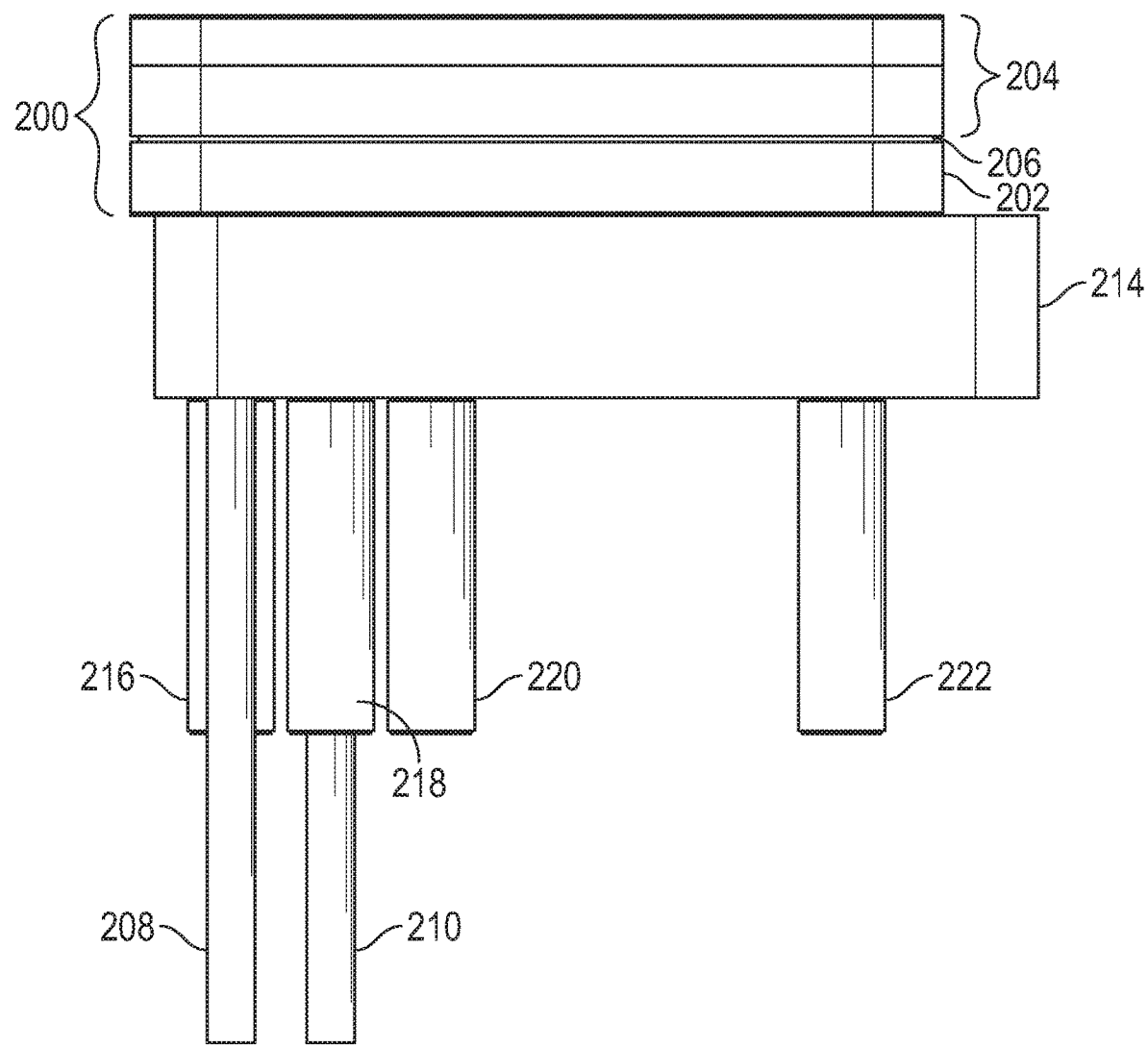
FIG. 4 shows a side view of a cassette assembly coupled to a station base.
Figure 5:
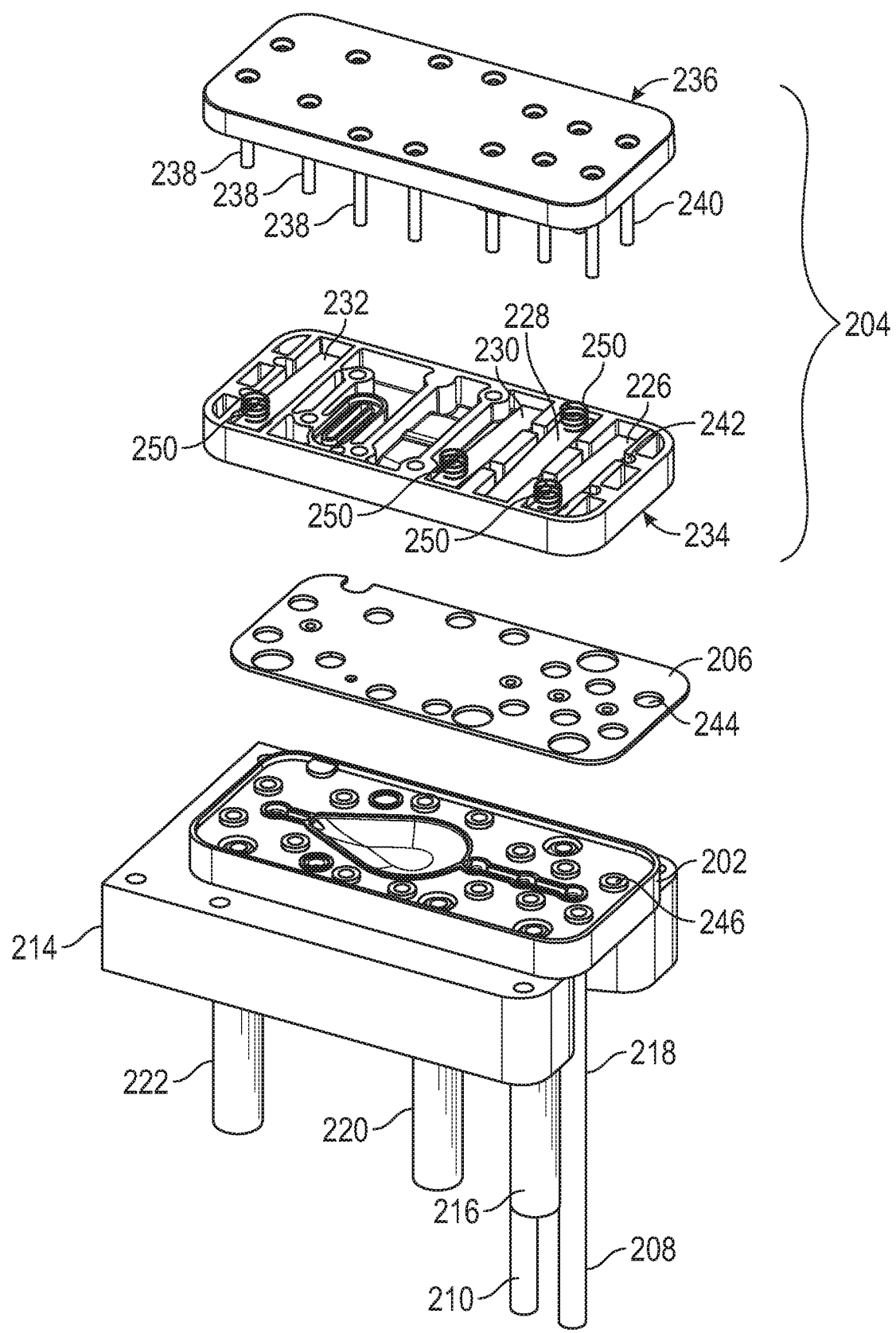
FIG. 5 shows an exploded view of the cassette assembly and station base.
Figure 6:
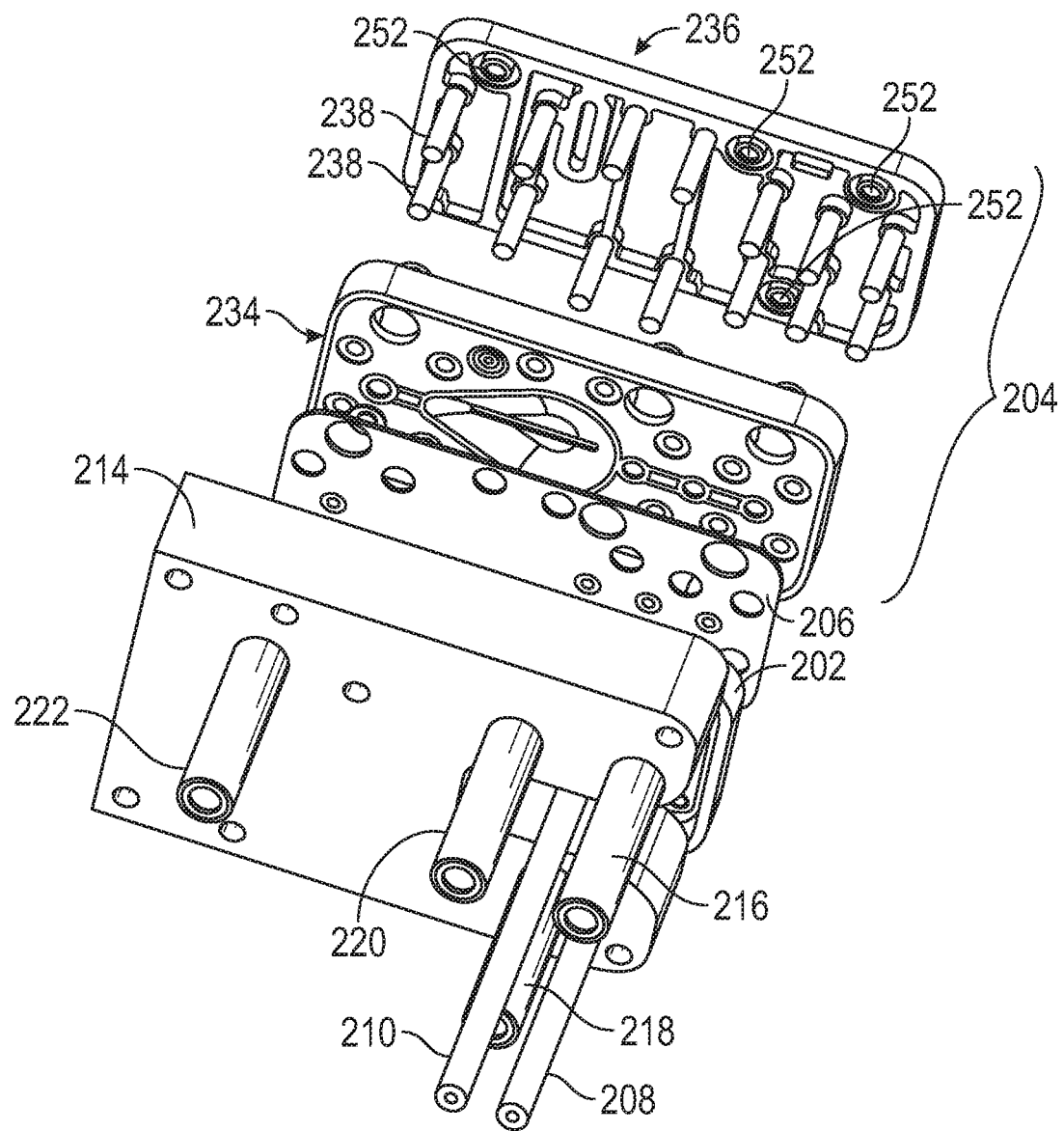
FIG. 6 shows the exploded view of FIG. 5 from a lower perspective.

As shown in FIGS. 4-6, the cassette assembly 200 can be coupled to a station base 214. Station base 214 can engage with the cassette assembly 200 so that a plurality of pneumatic air cylinders (or other actuators, such as electric actuators) can engage with a plurality of cassette rockers (or rocker arms) to open and close a plurality of valve ports in the cassette assembly 200. As used herein the term "cassette rocker" or "rocker arm" refers to a structure that can pivot and/or move between at least two positions when a force is applied at one or both ends.

The pneumatic air cylinders, therefore, are actuators that are in engagement with the cassette rockers, which are movable members that can move from a first position to a second position causing the elastomer membrane to move and open and close the valve defined by an opening and the elastomer membrane (e.g., a sample inlet valve, sample outlet valve, sanitizing fluid inlet valve, and/or gas inlet valve). As used herein, the term "in engagement" refers to an actuator or actuating member that is positioned so that it can engage with another structure to cause it to move. Therefore, a component can be "engaged" with an actuator even if the two are not in direct contact, so long as the actuator is in position so that it can cause the movement of the other component.

For example, in the embodiment shown in FIGS. 4-6, pneumatic air cylinders 216, 218, 220, 222 are coupled to station base 214 and engage with respective cassette rockers 226, 228, 230, 232 retained in cassette top 204. As shown in FIG. 5, cassette rockers 226, 228, 230, 232 are retained within a respective rocker guides in a lower portion 234 of cassette top 204. Upper portion 236 encloses the rocker guides and has a plurality of extending portions 238 (e.g., fingers) that engage with openings that extend through the cassette assembly to align and secure the respective components of the cassette assembly 200 in a desired orientation. For example, a first extension member 240 extends through an opening 242 in lower portion 234, an opening 244 in elastomer membrane 206, and an opening 246 in cassette base 202. Although not shown in FIG. 5, first extension member 240 can also extend though a cassette tube retaining member 248 (shown in FIG. 3).

Conventional fasteners can be used in place of some or all of the extending portions, or in other different locations in combination with some or all of the extending portions described in this embodiment.

Figure 7:
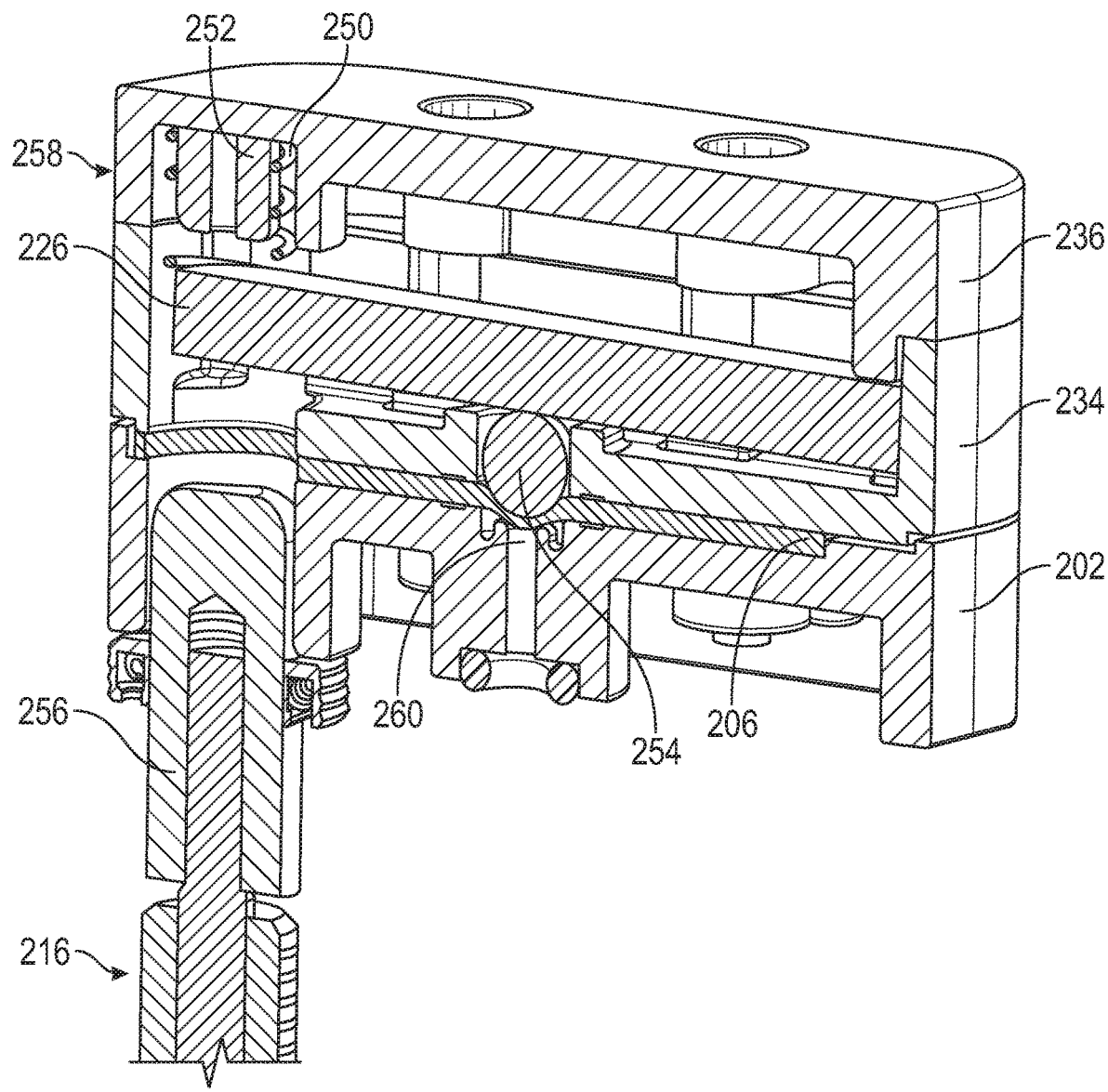
FIG. 7 shows a cross-sectional view of the sampling system to illustrate the operation of the actuators and cassette rockers.
Figure 8:
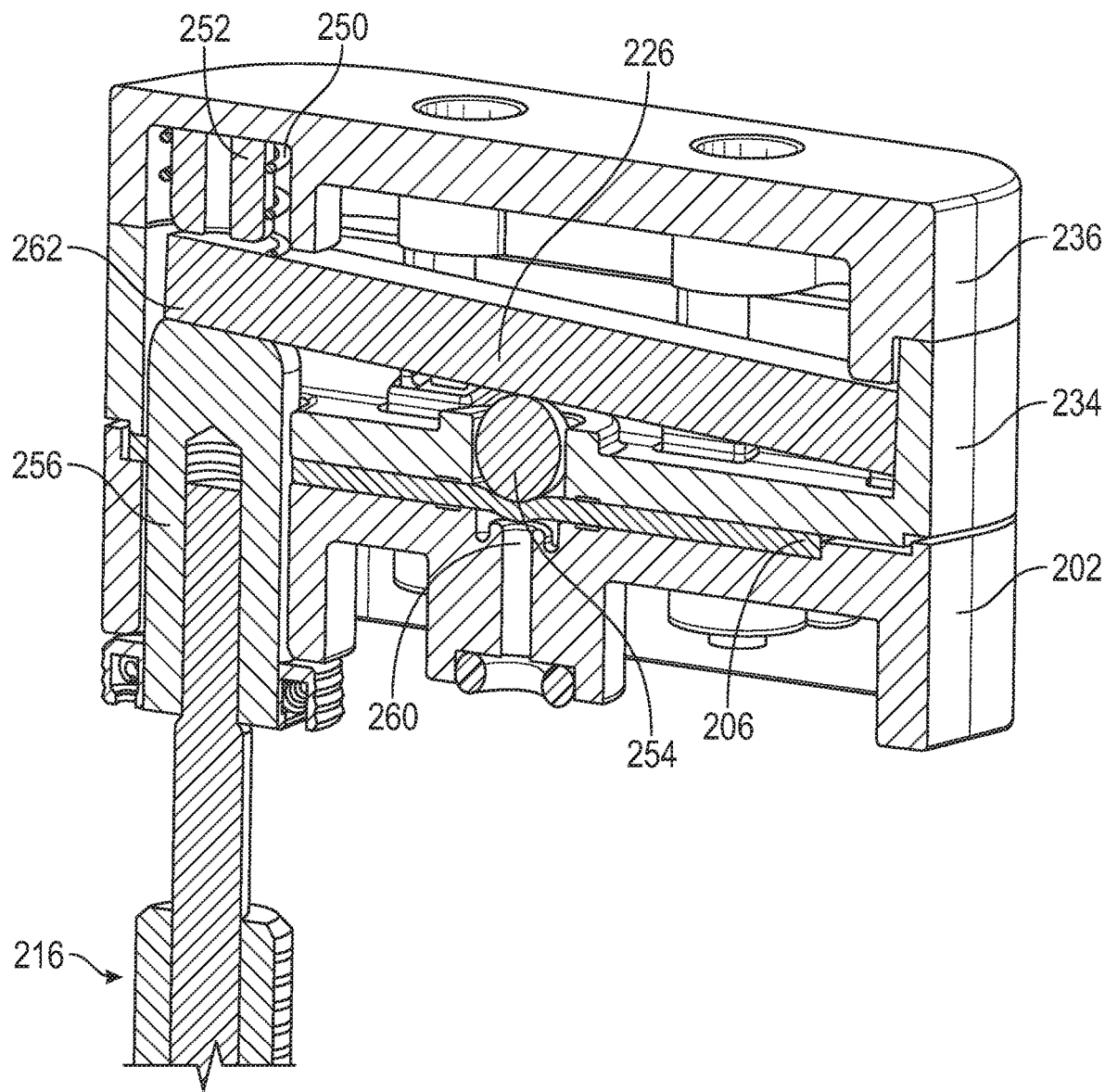
FIG. 8 shows another cross-sectional view of the sampling system to illustrate the operation of the actuators and cassette rockers.

Referring again to FIG. 5, each cassette rocker can be biased to a closed position by a spring member 250, which can be retained by a respective spring retaining well 252 (as shown in FIG. 6). FIGS. 7 and 8 illustrate the operation of the pneumatic air cylinders and cassette rockers.

As shown in FIGS. 7 and 8, each cassette rocker engages with a ball 254 to provide a rocker valve that can engage with the elastomer membrane 206 to open and close a respective valve port. FIG. 7 illustrates a rocker valve 258 in a closed state, and FIG. 7 illustrates the same valve in an open state. In the closed state (FIG. 7), an actuator nose 256 of pneumatic air cylinder 216 does not engage with the cassette rocker 226 of rocker valve 258. Instead, spring member 250 biases the cassette rocker 226 into engagement with ball 254, with ball 254 forcing a portion of the elastomer membrane 206 into engagement with the valve port 260.

In FIG. 8, the pneumatic air cylinder 216 has been actuated and the actuator nose 256 extends into contact with an end 262 of cassette rocker 226. The tilting of the cassette rocker 226 causes the spring member 250 to compress and reduces the force of the cassette rocker 226 on the ball 254. As the force on the ball 254 by the cassette rocker reduces, the force of the ball 254 on the elastomer membrane 206 likewise reduces, causing the valve port 260 to open and permit bi-directional flow therethrough.

Figure 9:
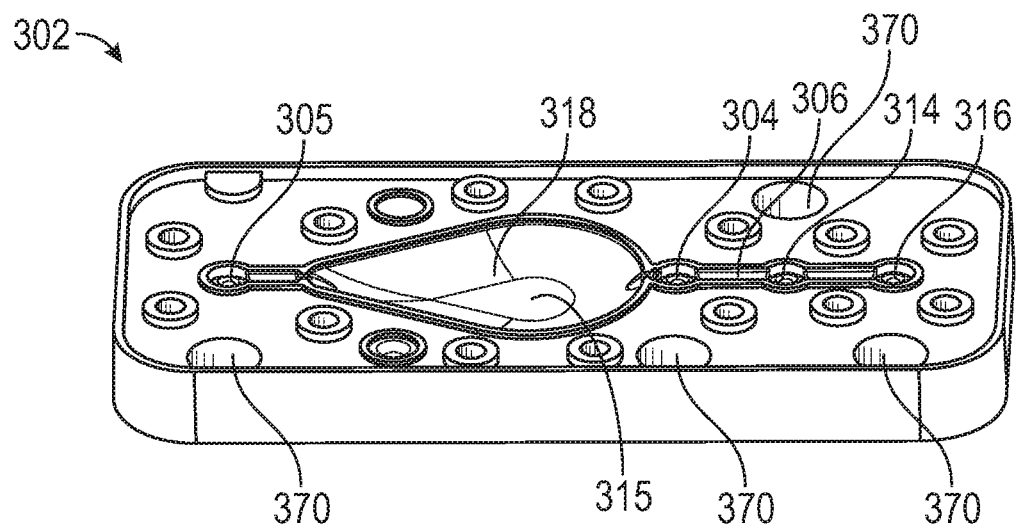
FIG. 9 shows a top perspective view of an exemplary cassette base.
Figure 10:
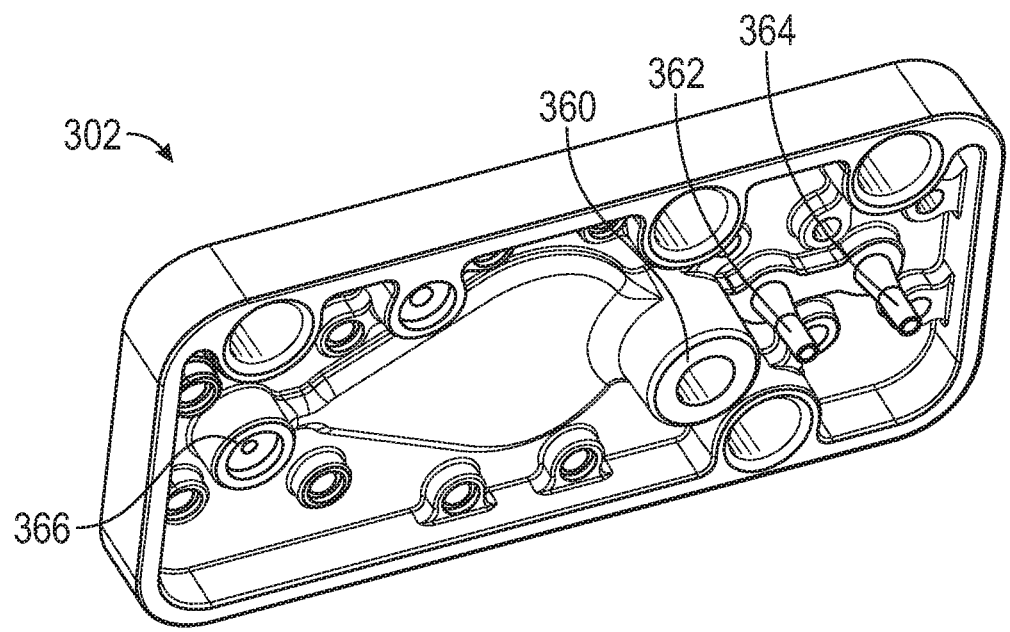
FIG. 10 shows a bottom perspective view of an exemplary cassette base.
Figure 11:
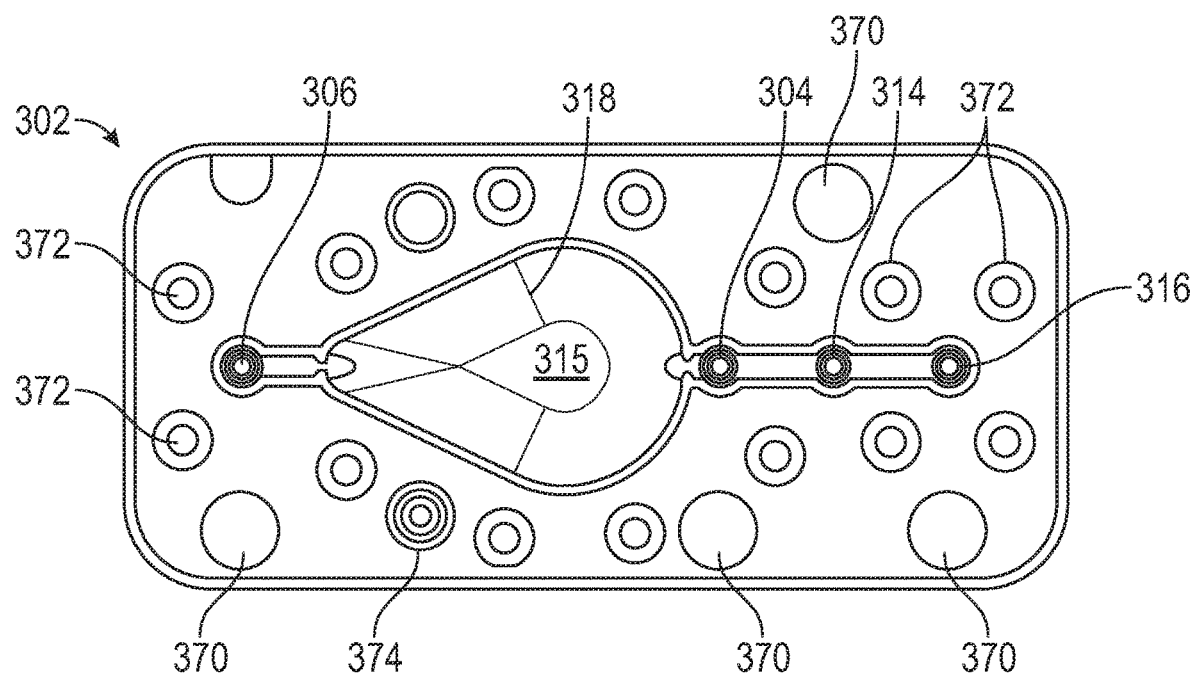
FIG. 11 shows a top view of an exemplary cassette base.

FIGS. 9-11 show additional details of a cassette base 302. As discussed above, the cassette base includes a plurality of valve ports that can be coupled to a tube or other conduit for coupling with other components of the sampling system, and opened and closed by a respective rocker valve.

Figure 14:
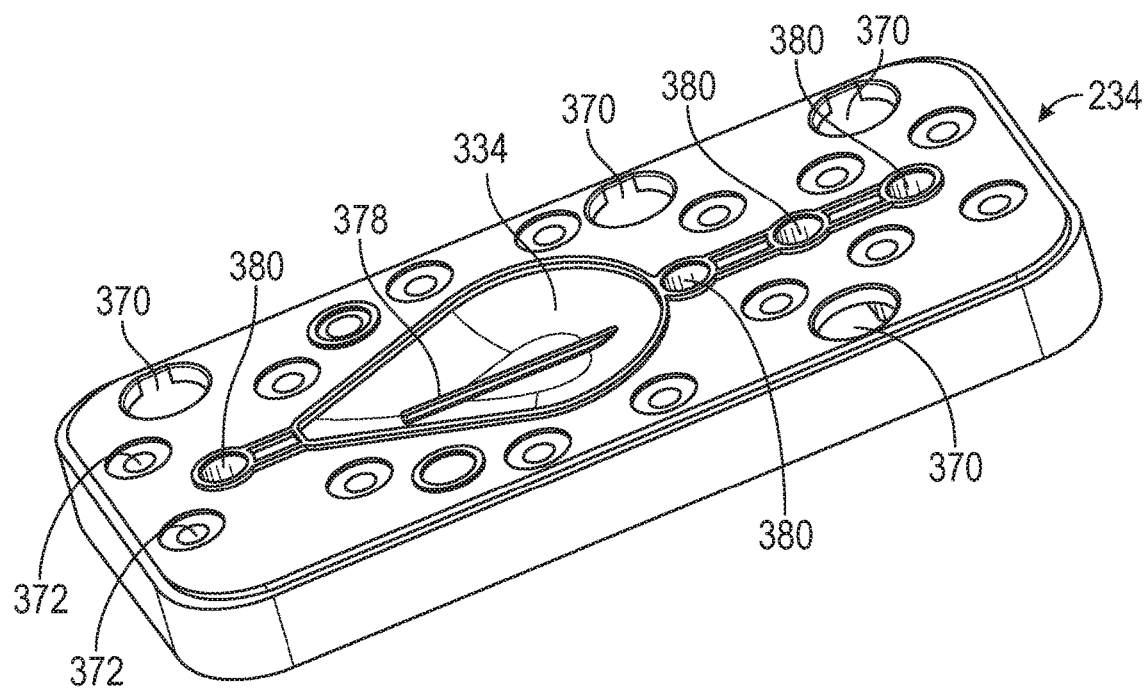
FIG. 14 shows a bottom view of the lower portion of the cassette top of FIG. 13.

As shown in FIG. 9, the plurality of valve ports can include a sample collection port 304, a sanitizing fluid inlet port 314, a gas inlet port 316, and a cavity 315 that, in part, defines reservoir 318. The reservoir 318 is also defined by the respective cavity of the lower portion 334 of the cassette top, as shown in FIG. 14. The volume of the reservoir 318 can vary depending on the position of the elastomer membrane as shown in FIGS. 2A-2D.

Figure 2D:
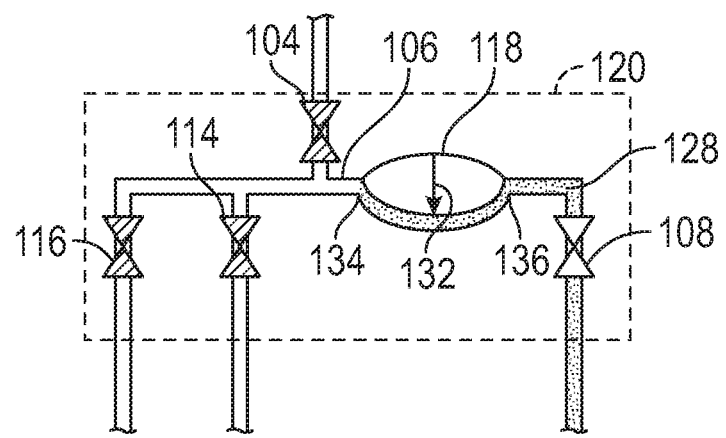

When the sample collection port 304 is opened, a sample can enter the fluid flow path 306 and be delivered to the reservoir 318 as shown in FIG. 2C. To deliver the sample from of the reservoir 318, the elastomer membrane is caused to move into the reservoir where the sample is located and force the sample out of the reservoir as shown in FIG. 2D. As the sample leaves the reservoir, it exit the outlet port 305, which has been moved into the open state or position.

FIG. 10 shows a bottom view of cassette base 302, which shows respective openings in fluid connection with the valve ports of the cassette base. These openings can receive and couple to respective tubes or conduits. For example, coupling members 360, 362, 364, and 366 can receive tubes or conduits in fluid connection with sample collection port 304, a sanitizing fluid inlet port 314, a gas inlet port 316, and outlet port 305, respectively.

FIG. 11 illustrates a top view of the cassette base 302. This view clearly shows a plurality of openings 370 in the cassette base 302 for the actuators (e.g., pneumatic air cylinders), which pass through the cassette base to engage with the cassette rockers in the cassette top 204. In addition, a plurality of alignment openings 372 are shown. These alignment openings 372 receive the extending portions 238 (fingers) of the upper portion 236 of the cassette top 204. FIG. 11 also shows an air flow opening 374. Opening 374 is in fluid connection with an area above the elastomer membrane to allow the reservoir to change its volume (i.e., to operate as a diaphragm pump). Air flow opening permits in the cassette base allows for the pump to be connected to a lower surface of the cassette base, which can be advantageous.

Figure 12:
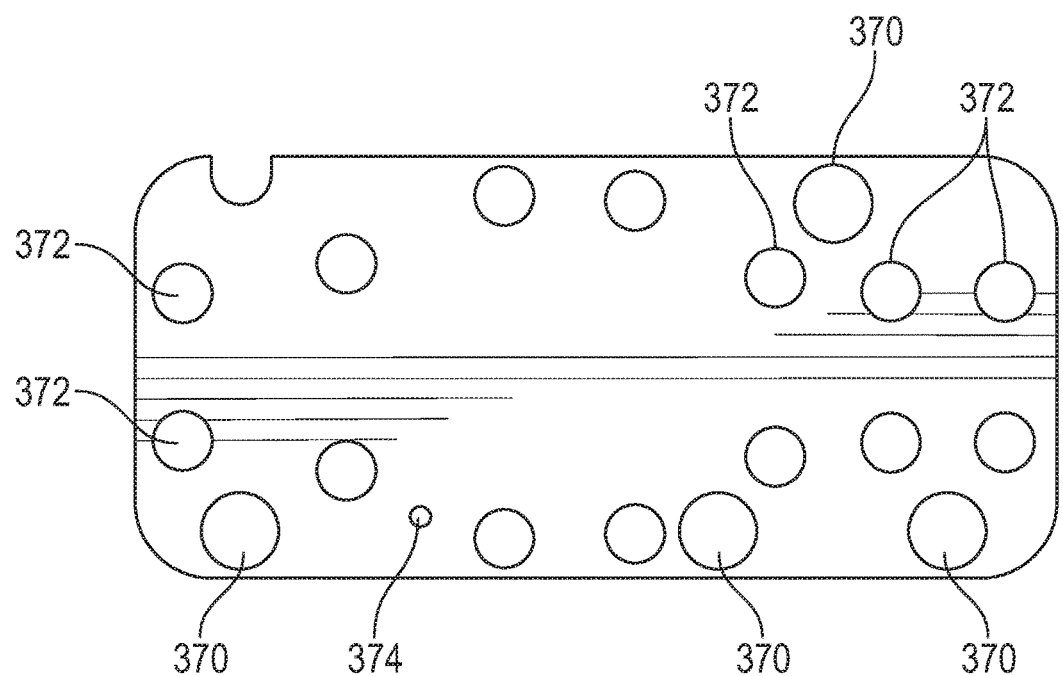
FIG. 12 shows an exemplary elastomer membrane for use with a cassette assembly.

FIG. 12 shows the elastomer membrane 206. As with the cassette base, the elastomer membrane has a plurality of openings 370 for the pneumatic air cylinders, a plurality of alignment openings 372, and an air flow opening 374.

Figure 13:
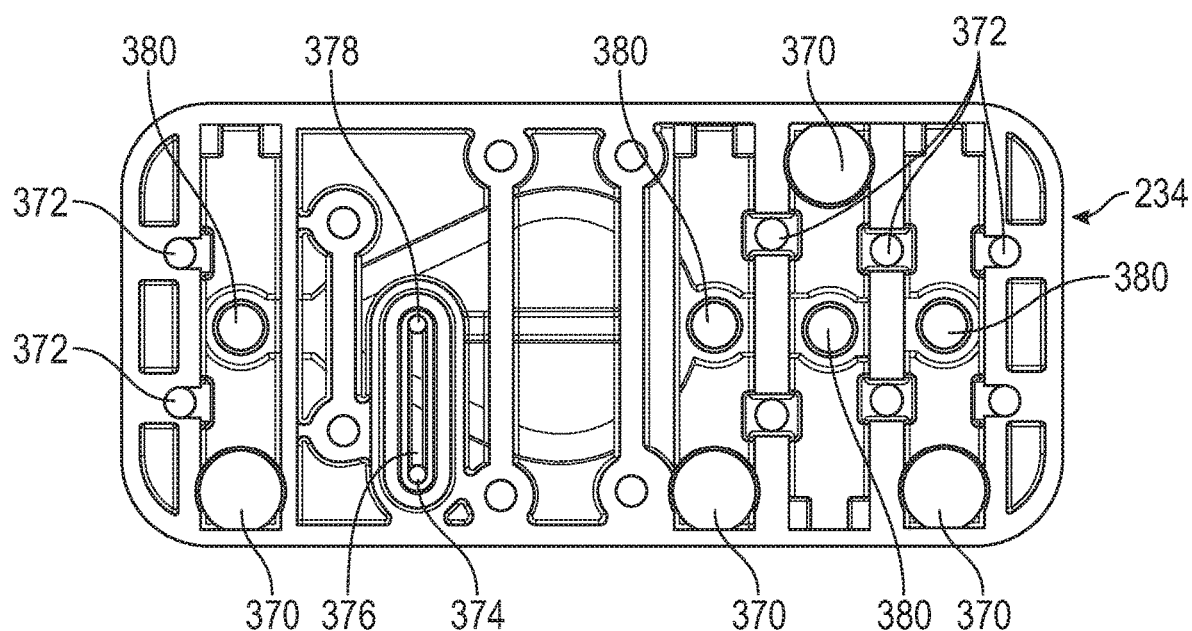
FIG. 13 shows a top view of a lower portion of a cassette top.

FIGS. 13 and 14 illustrate the lower portion 234 of the cassette top 204. FIG. 13 shows a top view and FIG. 14 shows a bottom view. As with the cassette base, the lower portion 234 of the cassette top 204 has a plurality of openings 370 for the pneumatic air cylinders, a plurality of alignment openings 372, and an air flow opening 374. In addition, as shown in FIG. 13, a channel 376 is provided in the top surface of the lower portion 234. This channel extends from air flow opening 374 to another opening 378 which is in fluid connection with a portion of the reservoir above the elastomer membrane. The channel 376 and openings 374, 378 cooperate to allow air from the pump to be delivered through the cassette assembly to a location in the reservoir and above the elastomer membrane.

FIGS. 13 and 14 also show the respective ball-receiving openings 380, which are sized to receive the balls 254, so that they can move downward to engage with the elastomer membrane and close a respective valve port, and upward to disengage with the elastomer membrane and open a respective valve port. FIG. 13 also shows the rocker guides (e.g., channels) which receive the cassette rockers.

Figure 15:
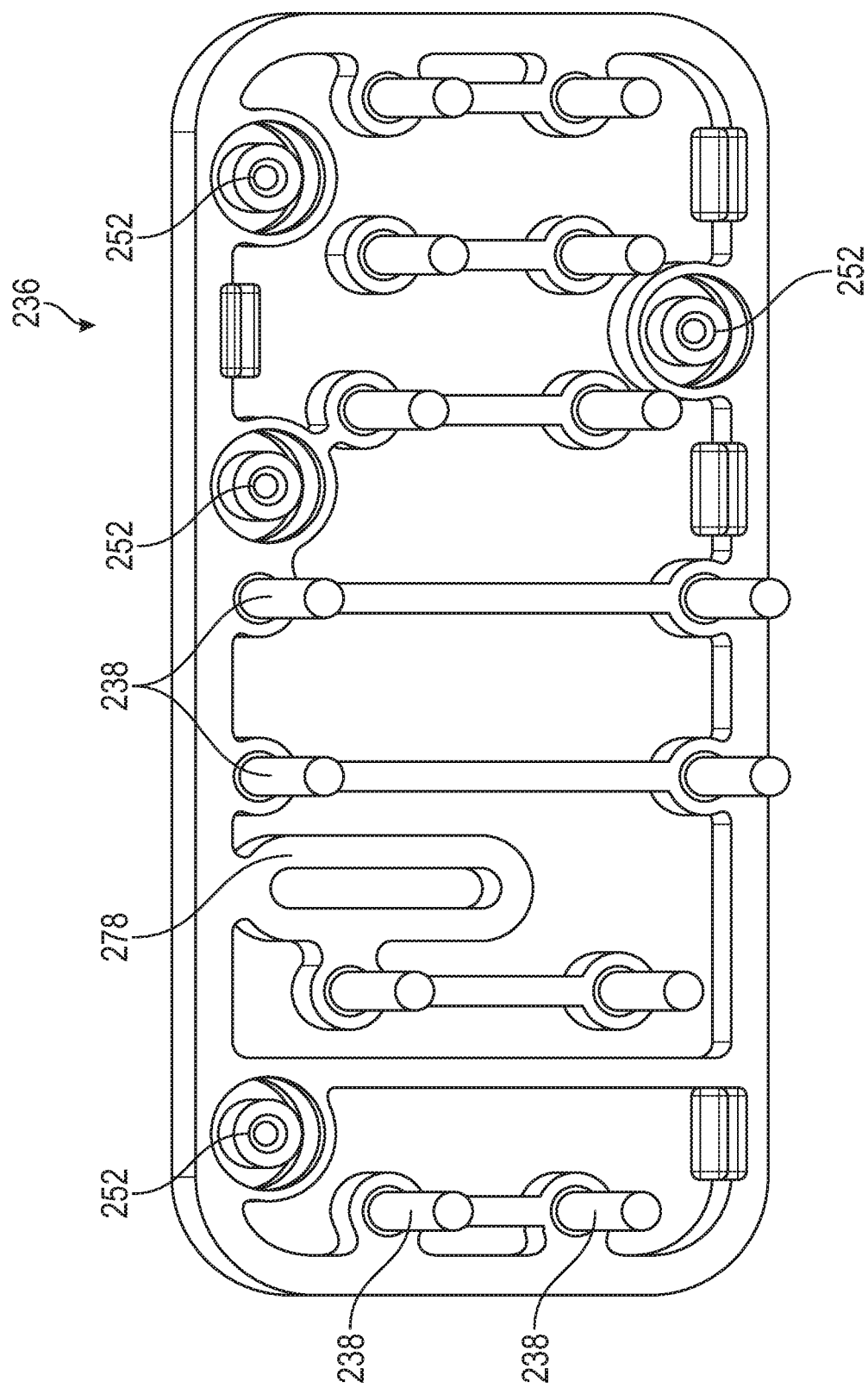
FIG. 15 shows a bottom view of an upper portion of the cassette top.
Figure 16:
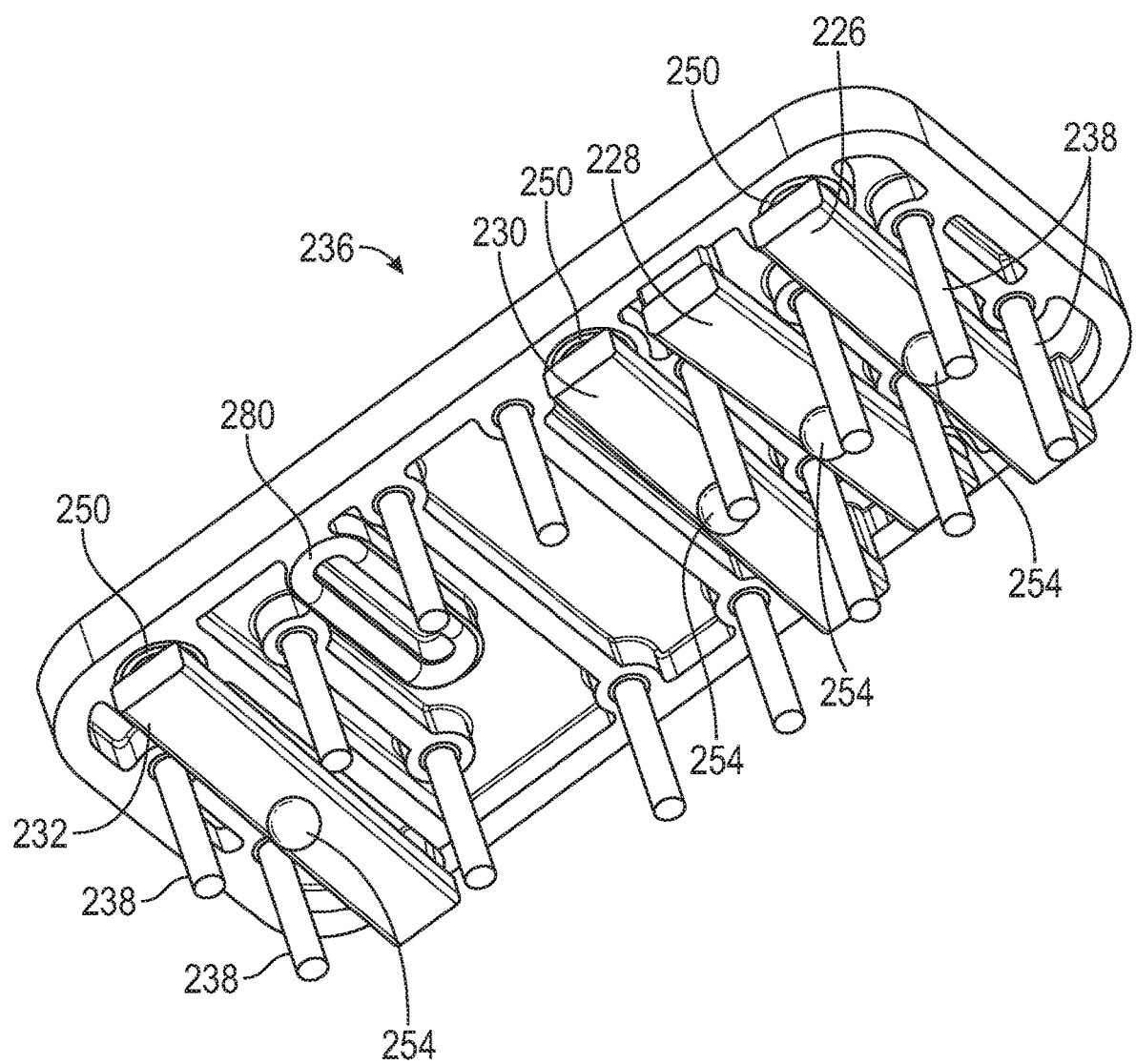
FIG. 16 shows a bottom perspective view of the upper portion of the cassette top with a plurality of cassette rockers and balls positioned therein.
Figure 17:
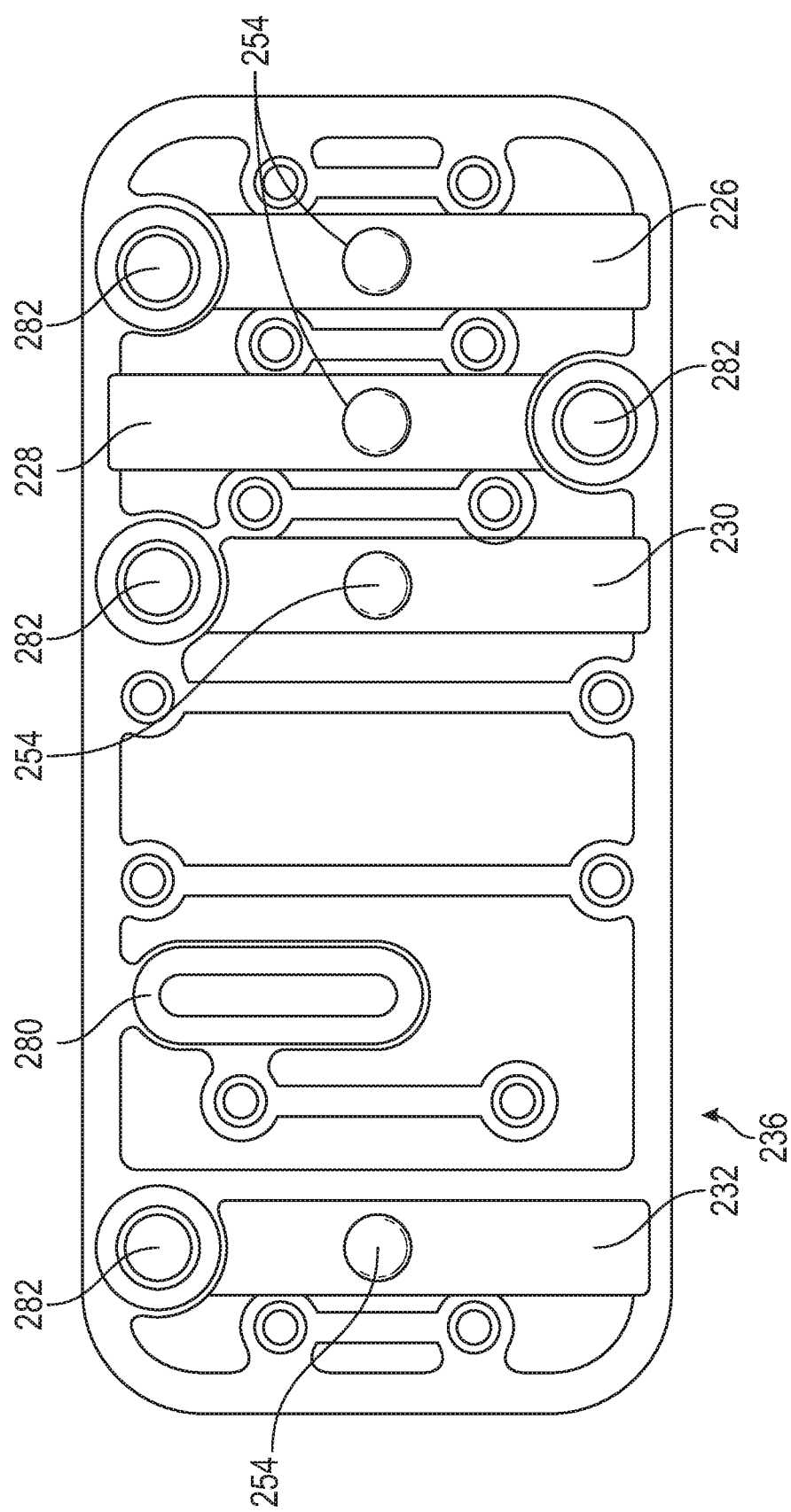
FIG. 17 shows a bottom view of the upper portion of the cassette assembly shown in FIG. 16.

FIGS. 15-17 show the upper portion 236 of cassette top 204, with the rocker valves (FIGS. 16 and 17) and without (FIG. 15). As discussed above, upper portion 236 encloses the rocker guides and has a plurality of extending portions 238 (e.g., fingers) that engage with openings that extend through the cassette assembly to align and secure the respective components of the cassette assembly 200 in a desired orientation. FIG. 15 also indicates a recess 278 that receives an O-ring 280 (FIGS. 16 and 17) that provides a sealing surface for the channel 376 in lower portion 234.

As shown in FIGS. 16 and 17, the respective cassette rockers 226, 228, 230, 232 are retained within a respective rocker guides in a lower portion 234 (not shown in these figures for convenience) and biased away from the upper portion 236 of the cassette top 204 by a spring member 250. Each cassette rocker can have a receiving surface 282 that engages with a respective actuator nose of a pneumatic air cylinder.

Figure 18:
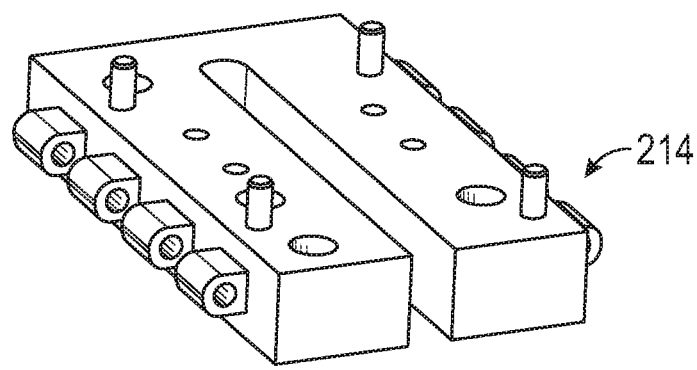
FIG. 18 shows a perspective view of an exemplary station base.
Figure 19:
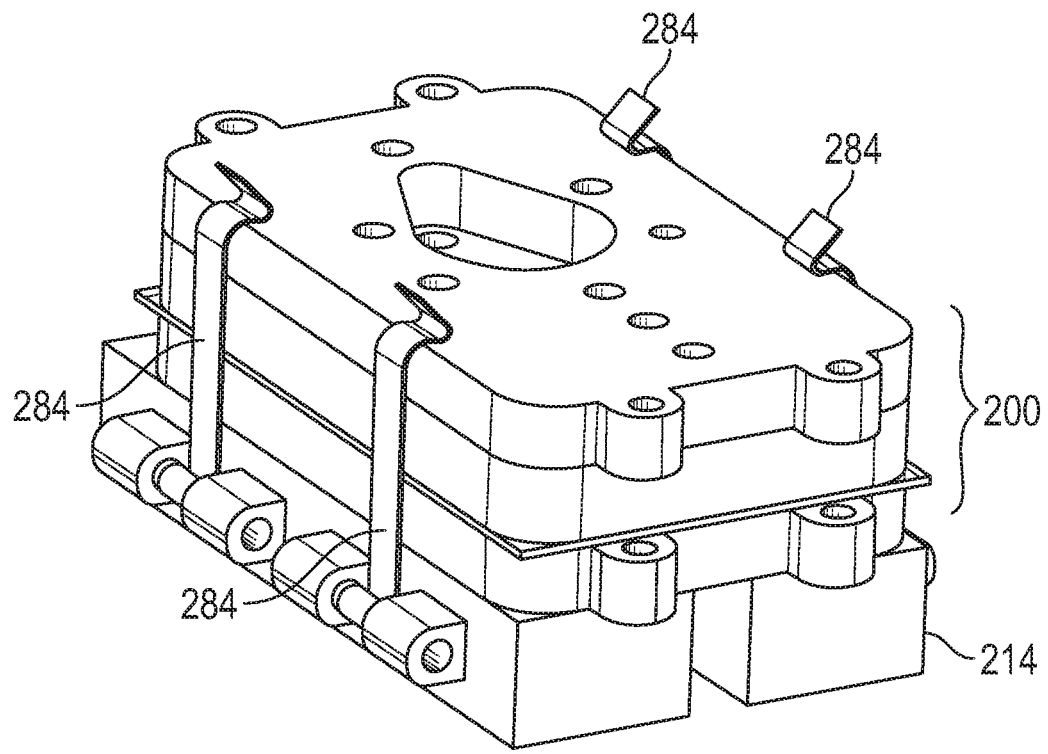
FIG. 19 shows a perspective view of a cassette assembly secured to the station base of FIG. 18.

The cassette assemblies described herein can be coupled and secured to a station base in a variety of manners. For example, FIG. 18 illustrates one exemplary station base 214 on which a cassette assembly can be received. FIG. 19 illustrates the same station base 214 with a cassette assembly received on a surface of the station base 214 and secured thereto with a plurality of gripping members 284, such as spring-loaded clamps.

Figure 20:
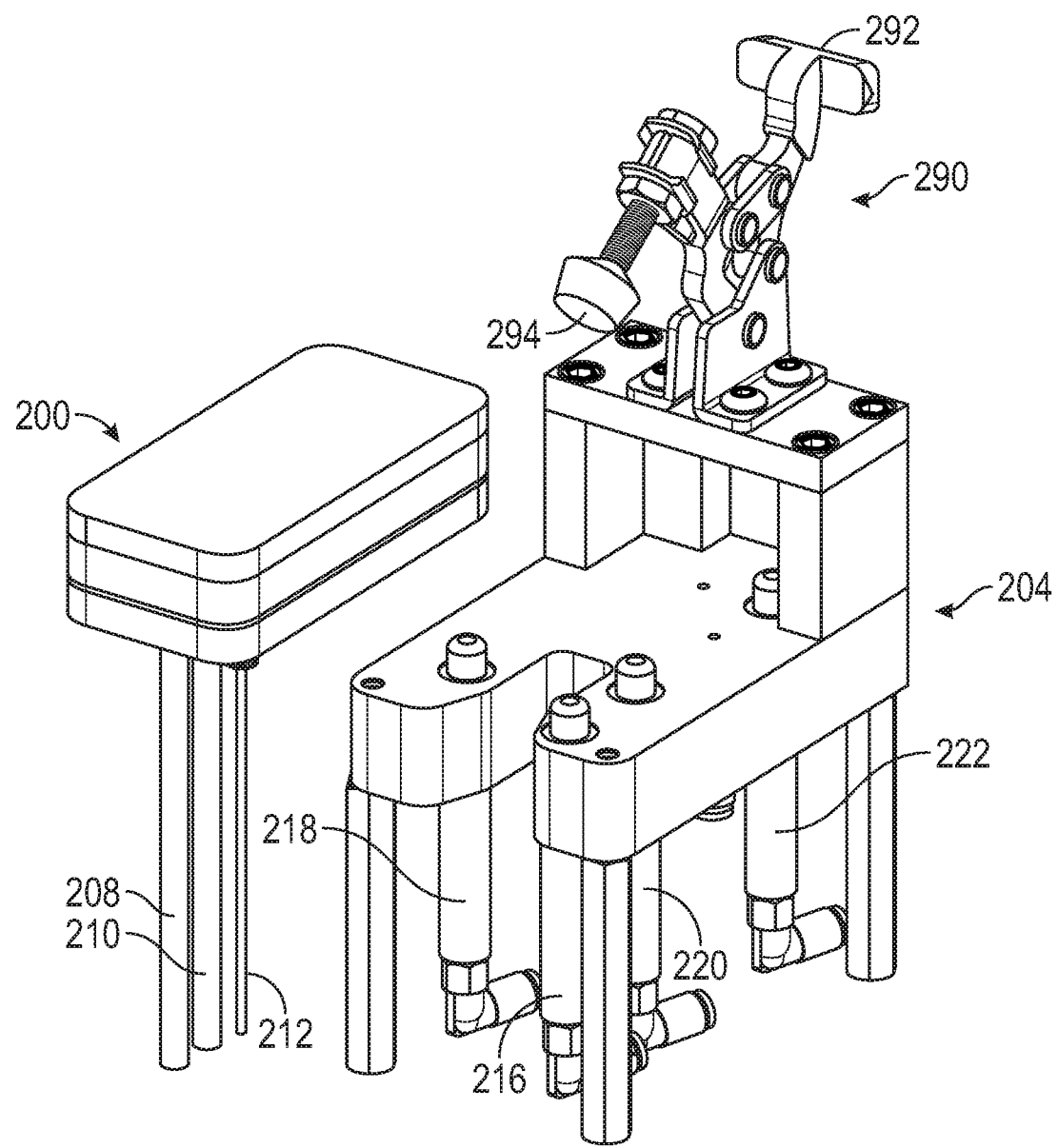
FIG. 20 shows a cassette assembly with another exemplary station base.

FIG. 20 illustrates another exemplary station base and attachment means. In particular, as shown in FIG. 20, a cassette assembly 200 can be received on a surface of station base 214. Station base 214 comprises the plurality of pneumatic air cylinders 216, 218, 220, 222, which engage with the cassette rockers as described above. After receiving the cassette assembly 200 on the station base 214, the tubes 208, 210, 212 of the cassette assembly 200 can be coupled additional tubing (e.g., using quick-connect fittings) to deliver and/or receive fluids from and to other areas of the system as discussed herein.

Thus, the sample can flow out outlet valve 108 (FIG. 1) and transition to the station base 214 via a seal (e.g., an o-ring seal) between the cassette assembly 200 and station base 214 at coupling 366 (FIG. 10).

In FIG. 20, the coupling of the cassette assembly 200 and base station 214 is achieved by a clamp member 290, which has a handle 292 (e.g., a lever) and a cassette-engaging member 294 (e.g., a clamping plate or surface). Of course, various other mechanisms can be provided to facilitate loading of a cassette assembly onto a station base. For example, in some embodiments, the loading and unloading of a cassette assembly can comprise a spring-loaded system that ejects an old cassette assembly and, upon receipt of a new cassette assembly, automatically closes to load the new cassette assembly on the station base.

The cassette assemblies described herein can be disposable (or "single-use" components) to allow for quick transitions from a first sampling procedure to a second sampling procedure (either with the same or a different type of sample), while the station base and related components (e.g., pneumatic air cylinders, clamping members) can be used without requiring sterilization. Thus, in contrast to conventional equipment which requires all components to be sterilized each time, only a portion of the sampling system requires sterilization.

The single-use cassette assembly can be readily sterilized, such as by gamma and/or autoclave sterilization. In some embodiments, the cassette assembly can be gamma compatible and pre-attached to other sterile sampling system components, such as bioreactor bags or pre-formed bioreactor vessels, prior to gamma sterilization, thereby eliminating the need to make an aseptic connection during setup.

Thus, for example, referring to the unitary structure 120 shown in FIG. 1, the entire structure 120 can be sterilized by, for example, gamma radiation, autoclave, or another approach, and connected to bioreactor 102 in a sterile fashion (such as sterile tube welding or a sterile single use connector). Alternatively, without separate sterilization of the structure 120, the structure 120 would need to be connected to bioreactor 102 and the entire assembly sterilized (gamma radiation, autoclave, etc.).

In addition to providing an easily replaceable wetting component, the cassette assemblies described herein also reduce the number of moving parts and connections that can be potential sources of sample contamination. Instead, the valve ports engage with a single diaphragm member (e.g., the elastomer membrane), thereby reducing sliding interfaces and other sources of potential contamination.

The sampling systems described herein can be easily scaled up and down in size as desired. In some embodiments, the pump volume of the sampling system is less than 20 mL, less than 10 mL, less than 5 mL, less than 3 mL, and, in other embodiments, less than 2 mL, such as about 1 mL. Thus, the sampling system can draw samples in relatively small increments from a dip tube or other sterile connector.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A sampling system for collecting a fluid sample from an enclosed container comprising: a station base having a pump member with a cassette-receiving surface and a plurality of actuators, the plurality of actuators including at least a first actuator, a second actuator, a third actuator, and a fourth actuator; wherein the plurality of actuators comprise pneumatic air cylinders or electric actuators, and a removable, unitary cassette assembly received on the cassette-receiving surface, the cassette assembly comprising:
   a cassette top having an air inlet disposed over a location of a variable volume reservoir and in engagement with the pump member to vary a pressure at a pump membrane;
   a cassette base comprising:
   a sample inlet,
   the variable volume reservoir, defined by a cavity within the cassette base and the cassette top, for receiving a sample from the sample inlet,
   a sample outlet, and a downstream fluid flow path, for delivering a gas, a sanitizing agent, or a sample, that extends between the sample inlet, the reservoir, and the sample outlet, a sanitizing fluid inlet, and a gas inlet, the sanitizing fluid inlet and the gas inlet being upstream of the sample inlet;
   the cassette top comprising a plurality of movable members that are in engagement with respective ones of the plurality of actuators, the plurality of movable members comprising: a first movable member that is in engagement with the first actuator, a second movable member that is in engagement with the second actuator, a third movable member that is in engagement with the third actuator, and a fourth movable member that is in engagement with the fourth actuator; and an elastomer membrane disposed between the cassette base and the cassette top; wherein the elastomer membrane extends over the reservoir and provides a pump membrane that is movable to vary a volume of the reservoir, wherein the first movable member is in contact with the elastomer membrane to provide a sample inlet valve that can be opened and closed by a movement of the first actuator, and the second movable member is in contact with the elastomer membrane to provide a sample outlet valve that can be opened and closed by a movement of the first actuator, and wherein the third movable member is in contact with the elastomer membrane to provide a sanitizing fluid inlet valve that can be opened and closed by a movement of the third actuator, and the fourth movable member is in contact with the elastomer membrane to provide a gas valve that can be opened and closed by a movement of the fourth actuator.

2. The sampling system of claim 1, wherein the station base further comprises one or more attachment members for securing the cassette assembly to the cassette-receiving surface.

3. The sampling system of claim 2, wherein the one or more attachment members comprise clamp members or other locking members that restrict movement of the cassette assembly when received on the station base.

4. The sampling system of claim 1, wherein wetting components of the sampling system are in the cassette assembly and, other than a sample line out, the station base does not come into direct contact with the sample during operation.

5. The sampling system of claim 1, wherein the plurality of moveable members are a rocker valve, the rocker valve comprising a rocker arm that is in engagement with a respective one of the plurality of actuators and a curved member that is in contact with the elastomer membrane.

6. The sampling system of claim 5,
   wherein each of the rocker arms is movable from a first position in which the respective valve is closed and a second position in which the respective valve is open, and
   wherein each of the rocker arms has a first end in engagement with a respective one of the plurality of actuators and a second end that is in contact with a spring member, the spring member biasing the rocker arm to the first position.

7. The sampling system of claim 5,
   wherein each of the rocker arms is movable from a first position in which the respective valve is closed and a second position in which the respective valve is open, and
   wherein each of the rocker arms has a first end in engagement with a respective one of the plurality of actuators and a second end that is in contact with a spring member, the spring member biasing the rocker arm to the second position.

8. The sampling system of claim 1, wherein the elastomer membrane comprises silicone, EPDM, Viton, or CFLEX.

* * * * *